April 25, 1961

J. LAMONT ET AL 2,981,919

RELAY TEST FIXTURE

Filed March 27, 1959

INVENTORS
J. LAMONT
A. J. STERN

BY
ATTORNEY

April 25, 1961 J. LAMONT ET AL 2,981,919
RELAY TEST FIXTURE
Filed March 27, 1959 7 Sheets-Sheet 3

INVENTORS
J. LAMONT
A. J. STERN
BY
ATTORNEY

April 25, 1961  J. LAMONT ET AL  2,981,919
RELAY TEST FIXTURE
Filed March 27, 1959  7 Sheets-Sheet 5

INVENTORS
J. LAMONT
A. J. STERN
BY
ATTORNEY

United States Patent Office 2,981,919
Patented Apr. 25, 1961

2,981,919
RELAY TEST FIXTURE

John Lamont, North Arlington, and Adolf J. Stern, Glen Rock, N.J., assignors to Western Electric Company, Incorporated, New York, N.Y., a corporation of New York Filed Mar. 27, 1959, Ser. No. 802,375

13 Claims. (Cl. 339—75)

This invention relates to apparatus for making electrical connections with leads particularly leads of electrical components to be tested.

Most electrical units or components are to be given certain tests to determine whether or not they are suitable for use. The time required for the testing operations depend largely upon the time required to make electrical connections with the leads of the components to include them in predetermined circuits of test sets.

An object of the present invention is an efficient apparatus for making electrical connections with leads extending from one end of an electrical component.

Accordingly the invention comprises normally open clamps, for a group of leads of a component, movable relative to a support for the component so that the clamps will straddle their leads prior to movement of the component into a testing position, after which the clamps are caused to grip the leads.

More specifically the clamps are supported by a dielectric member, caused to ride with the carriage between given limits and when moved to one limit the clamps are positioned to straddle their leads. The clamp closing means includes another dielectric member mounted on the carriage to force the clamps closed during the second movement of the carriage. A lead controlling element is movable between groups of leads to hold them in the normally open clamps. A driving means for both the carriages shown, and for the support and the lead controlling element originates with a single drive to rotate a drive shaft in reverse directions. Rotation of the drive shaft in one direction causes operating units of drive and driven members to move the carriages, support and element through an operating cycle in one direction. A reverse movement of the shaft causes them to move in reverse order to their normal positions.

Other objects and advantages will be apparent from the following detailed description when considered in conjunction with the accompanying drawings wherein:

Figure 5:
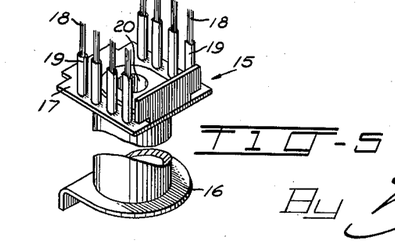
Fig. 5 is an isometric view of a component to be tested.

In Fig. 5 a component illustrated generally at 15 is a relay having a base 16 and a head 17 with two rows of leads 18 connected to their respective windings of the relay and extending upwardly from the head 17. Lower portions of the leads 18 are covered with insulating material 19 while the upper ends of the leads are bare. The leads in the present illustration are shown straight and parallel with each other and also parallel with the central longitudinal aperture 20 of the relay. However, this condition seldom exists during the handling of the relays or any other electrical component having flexible leads extending therefrom. It is a known fact, however, in the present instance that the leads 19 are secured at their lower ends in their aligned rows at definite positions spaced with respect to each other and any disturbances in the relative positions of the leads most usually exist in the outer or bare ends of the leads.

Figure 1:
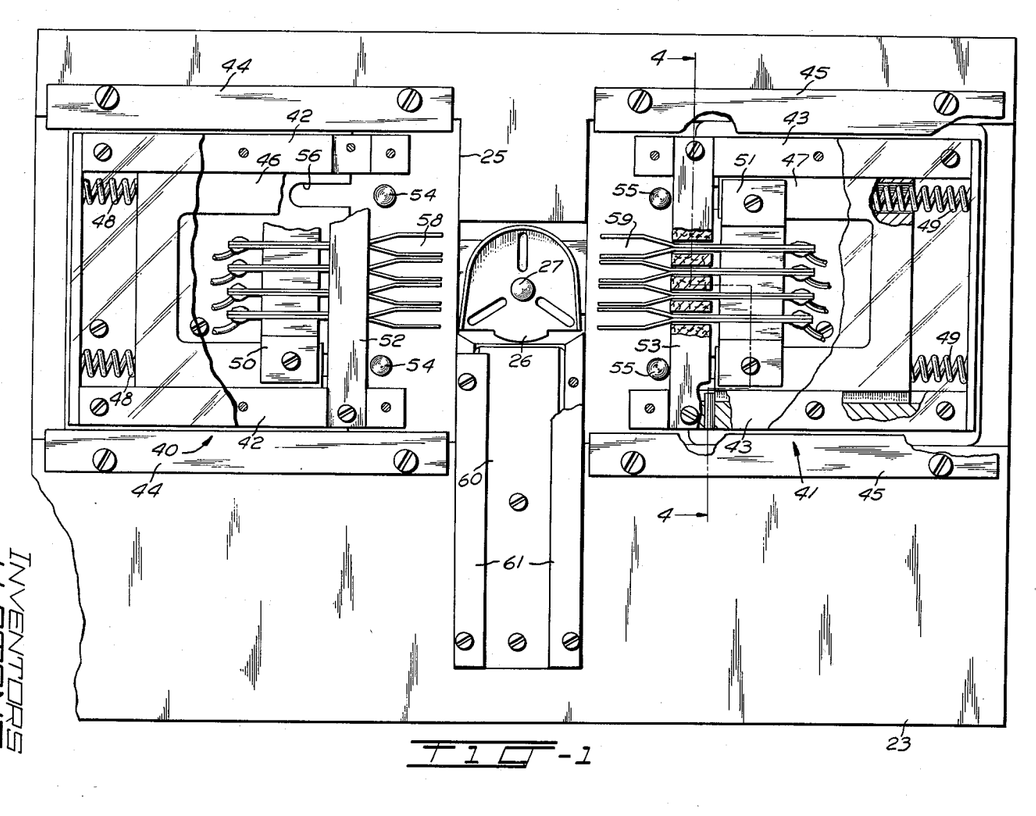
Fig. 1 is a top plan view of the apparatus.

The purpose of the apparatus is to support the component 15 and connect the bare ends of the leads in test circuits (not shown) by clamps formed of conductive material. The apparatus as shown in Fig. 1 includes a cover 23 for a main housing 24 Fig. 2, the cover having an opening 25 for exposing a support 26. The support 26 is in the form of a nest to receive the base 16 of the component in a definite position to locate the two groups of leads 18 in their spaced parallel rows in the manner illustrated in Figs. 2 and 3. The support 26 has a centering pin 27 receivable in the aperture 20 of the component 15 to assist in holding the component against displacement during operation of the apparatus. The centering pin 27 and the support 26 are mounted on a member 28. The member 28 extends laterally and is provided with apertures in which bushings 29 are mounted. The bushings 29 are slidable on parallel guide rods 30 which are mounted at 31 on a base 32 of the housing 24. Locating elements 34 are supported by bushings 35 which ride upon the rods 30 above the bushings 29. The locating elements 34 are positioned at the ends of the lateral member 28 and have elongate apertures 36 therein to receive projections 37 extending from the ends of the lateral member to ride in their respective apertures. At certain intervals bottom surfaces 38 of the apertures 36 of the elements 34 support the horizontal member 28 and the support 26.

Figure 3:
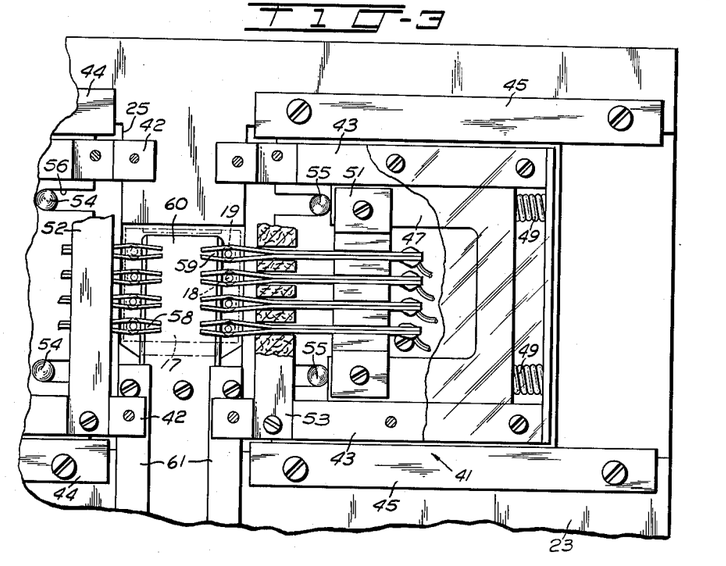
Fig. 3 is a fragmentary top plan view of the apparatus shown in operated position.

Units indicated generally at 40 and 41 are disposed on the cover 23 at opposite sides of the opening 25 and the support 26. The units 40 and 41 are substantially identical with exception that they are normally positioned away from the support 26 on opposite sides thereof and are moved toward each other and the support during operation of the apparatus. The units have carriages 42 and 43 movable in parallel guides 44 and 45. Riding elements 46 and 47 are slidably supported by their carriages 42 and 43 and caused to travel with their carriages toward a support 26 through the actions of springs 48 and 49. The springs 48 and 49 normally hold dielectric members 50 and 51 of the riding elements 46 and 47 adjacent clamp closing members 52 and 53 of the carriages but are compressible when the riding elements are caused to stop their movements toward each other when engaging pins 54 and 55. The pins 54 and 55 are mounted on the cover plate 23 and are aligned with recesses 56, only one of which is shown, in their respective riding elements. Pairs of resilient clamps 58 and 59 of the contours shown in Fig. 1 and formed of conductive material, are mounted firmly in the dielectric members 50 and 51 and extend through narrow apertures of their respective clamp closing members 52 and 53. The inner ends of the clamps 58 and 59 are disposed normally in parallel opened positions for movement readily to straddle their respective leads 18. However, the resilient nature of the clamps cause them to close on and firmly grip the leads as shown in Fig. 3 after additional movement of the carriages with the clamp closing members 52 and 53 toward the support 56.

A lead controlling element 60 is slidably mounted in guides 61 and positioned with respect to the support 26 to move over the head 17 of the component 15 after the support with the component have moved downwardly a given distance. The function of the element 60 is to move between the two groups of leads 18 after the open clamps 59 have been moved to straddle the leads. In this position the element 60 will tend to straighten the leads, if they should be bent inwardly, and force them to stay in their respective open clamps during additional downward movement of the support 26 and the component 15.

Figure 6:
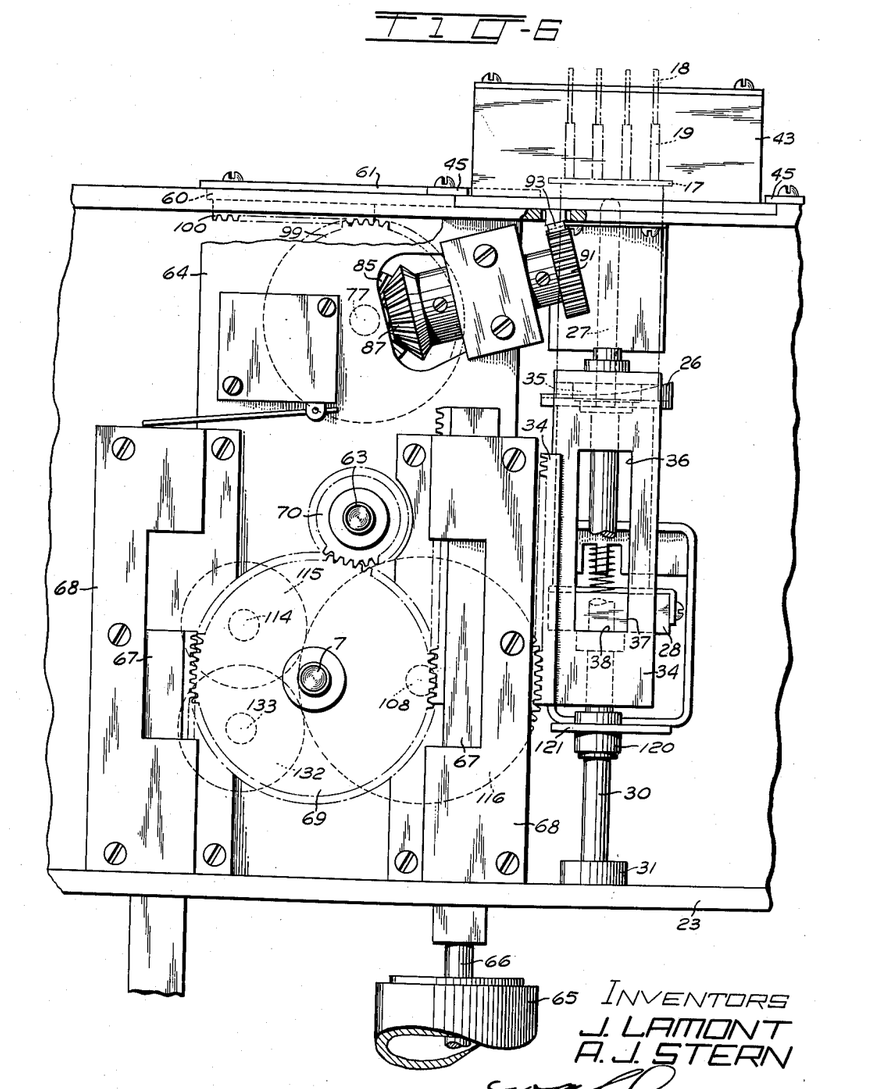
Fig. 6 is a vertical sectional view taken along the line 6—6 of Fig. 2.
Figure 10:
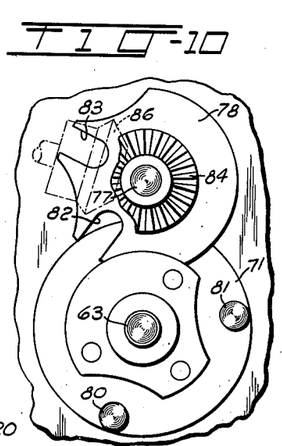
Fig. 10 is a fragmentary sectional view taken along the line 10—10 of Fig. 2.
Figure 11:
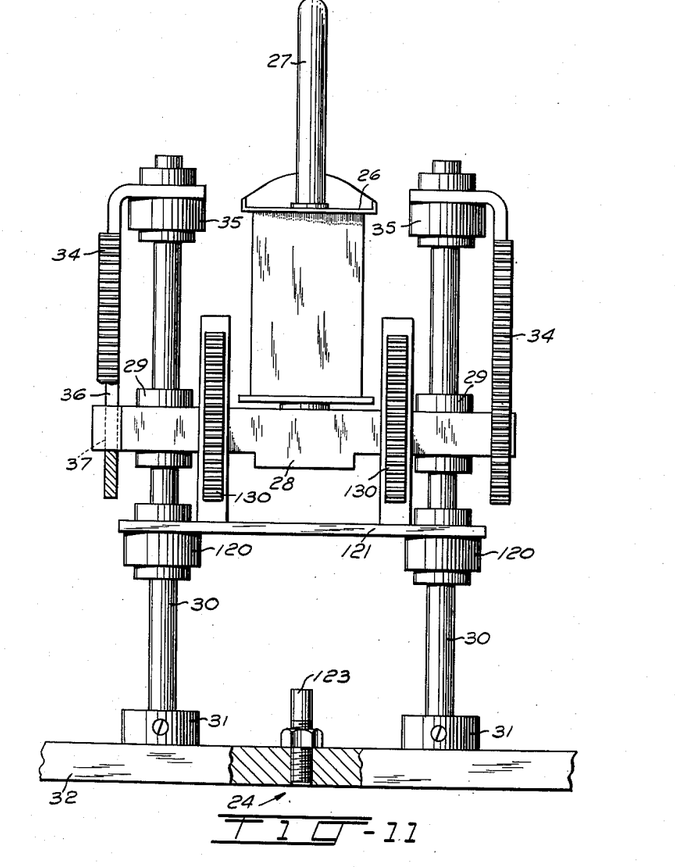
Fig. 11 is an elevational view of the component support and part of the moving means therefor.

The drive means for the cradles 42 and 43, for the support 26 and for the lead controlling element 60 originates with a drive shaft 63 which is journaled in suitable bearings (not shown) in parallel frame members 64. In the present instance the power means for the shafts 63 is an air cylinder 65 (Fig. 6) which is fixedly mounted beneath a housing 23 and is supplied with air under pressure at predetermined intervals to cause upward and downward movement of its piston rod 66. A rack 67 mounted on the upward end of the piston rod 66 is slidable in a guide 68 and interengages a gear 69 rotatably on a stub shaft 70. The gear 69 interengages a gear 70 which is mounted on the drive shaft 63. Through the action of the air cylinder at spaced intervals in opposite directions, like, but reverse rotary motions, are imparted to the drive shaft. Drive members 71, 72, 73, 74 and 75 are fixedly mounted on the drive shaft 63. The drive members 71 and 75 are substantially identical and jointly serve to impart the spaced rotary motions to a shaft 77 through driven members 78 and 79 fixedly mounted thereon. One of the sets of driving means for the shaft 77 is shown in Fig. 10. Here the drive member 71 is provided with two pins 80 and 81 disposed at spaced positions to interengage their respective notches 82 and 83 of the driven member 78 to impart the spaced rotary motions to the shaft 77. A similar structure for the drive member 75 and the driven member 79 join the drive member 71 and the driven member 78 to rotate the shaft 77. If desired, the shaft 77 may support the driven members 78 and 79 for free rotation thereon. In this instance the driven members 78 and 79 would be fixed to their leveled gears 84 and 85. The gears 84 and 85 interengage similar gears 86 and 87 which are mounted on shafts 88 and 89 journaled in suitable bearings and having gears 90 and 91 mounted on the positioning ends thereof. The gears 90 and 91 interengage racks 92 and 93 which are fixed, as shown in Fig. 6, to the under surfaces of their respective carriages 42 and 43.

Figure 2:
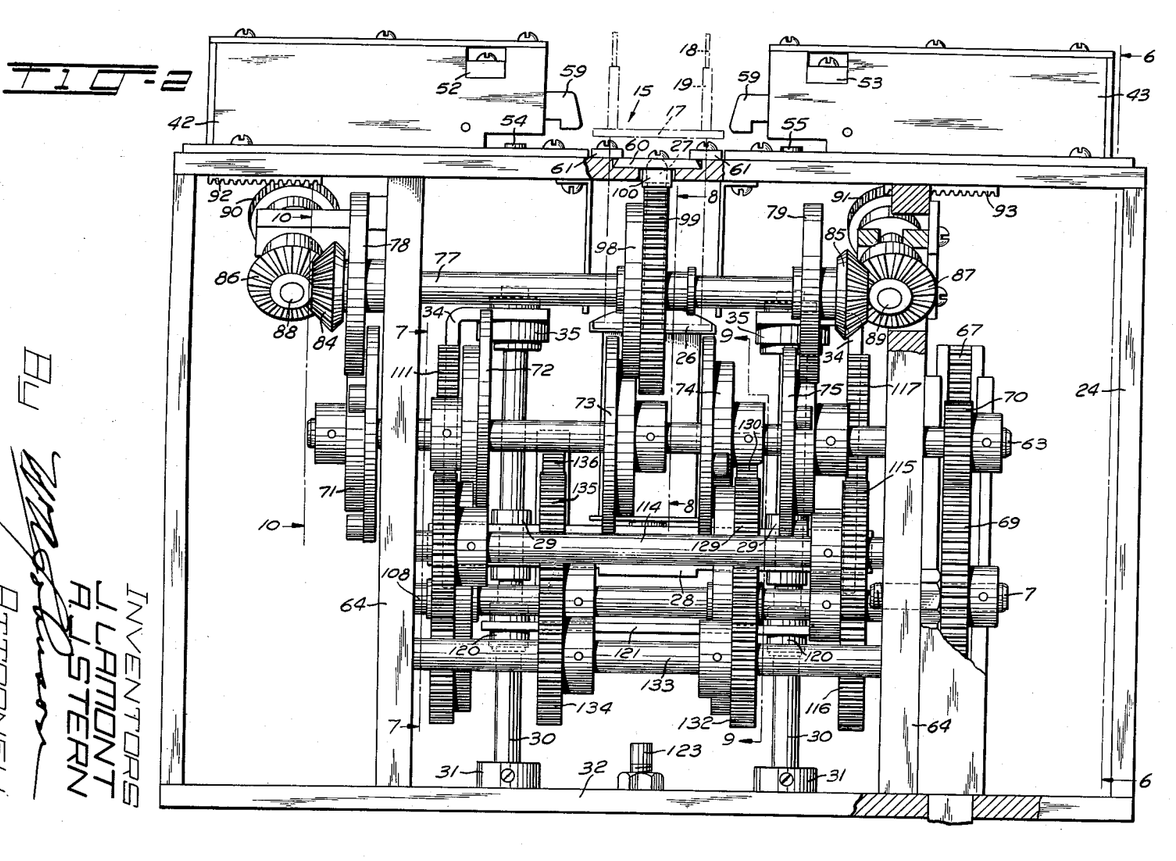
Fig. 2 is a rear elevational view of the apparatus.
Figures 7, 8:
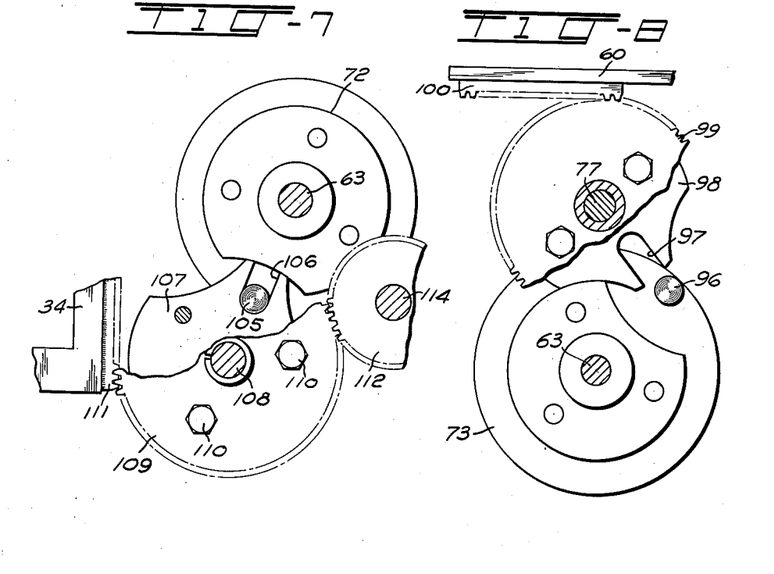
Fig. 7 is a fragmentary sectional view taken along the line 7—7 of Fig. 2.
Fig. 8 is a fragmentary sectional view taken along the line 8—8 of Fig. 2.
Figure 9:
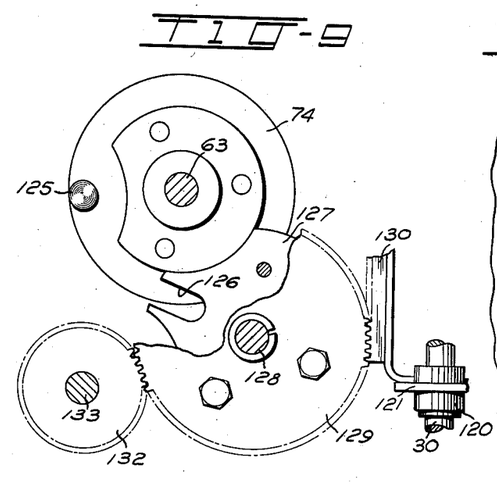
Fig. 9 is a fragmentary sectional view taken along the line 9—9 of Fig. 2.

The drive member 73, Figs. 2 and 8, has a single pin 96 for interengaging a notch 97 of a drive member 98 which is free to rotate on the shaft 77. The drive member 98 is fixed to a gear 99 which interengages a rack 100 mounted on the under surface of the lead controlling element 60 to impart movement to the element.

Figure 4:
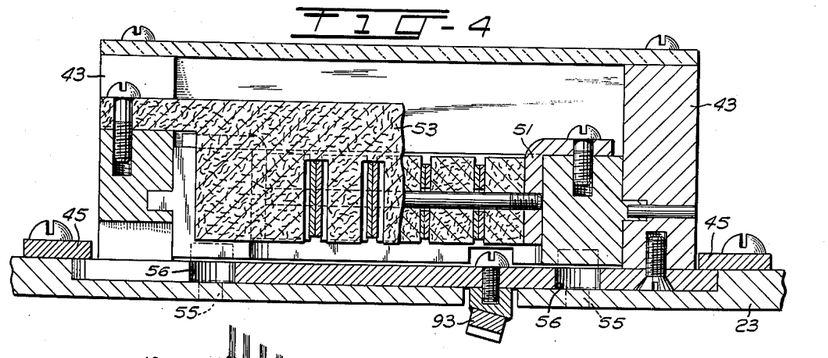
Fig. 4 is an enlarged sectional view taken along the line 4—4 of Fig. 1.

Two drive means are provided for the support 26 to move the support the two distances from its normal position. The first drive means originates with the drive member 72 shown in Figs. 2 and 7. The member 72 has a single pin 105 to interengage a notch 106 of a driven member 107 which is free to rotate on a shaft 108. The driven member 107 has a gear 109 fixed thereto as at 110 and positioned to interengage a rack 111 which is secured to one side of its adjacent locating element 34. The gear 109 drives a gear 112 which is fixed to a shaft 114. The shaft 114 is journaled in suitable bearings and extends laterally in Fig. 2 to support a gear 115 which is similar to the gear 115. The gear 115 drives a gear 116 mounted rotatably on a shaft 108 while the gear 116 interengages a rack 117 which is mounted on the other locating element 34. This driving means for the elements 34 causes them to move simultaneously. At the start of the operating cycle the locating elements 34 will move downwardly a distance first to allow the bushings 29 to rest upon bushings 120 which are slidably mounted on the guide rods 30 and joined by a cross bar 121. The elements 34 continue downwardly when actuated to permit a second movement of the support 26 by moving the bushings 120 and the connecting bar 121 downwardly until the bar rests upon an adjustable stop 123. The second driving means for the support begins with the drive member 74 Figs. 2 and 4. The drive member 74 has a single pin 125 receivable in a notch 126 of a driven member 127 which is freely rotatable on a shaft 128 and has a gear 129 fixed at 130 thereto. The gear 129 engages an adjacent rack 130 which is fixed to the cross bar 121. The gear 129 also interengages a gear 132 which is fixed to a shaft 133. The shaft 133 is journaled in the suitable bearings and has a gear 134 mounted thereon. The gear 134 interengages a gear 135 which is identical to gear 129, this gear interengaging a rack 136 similar to rack 130 and mounted on the cross bar 121.

Operation

Figure 12:
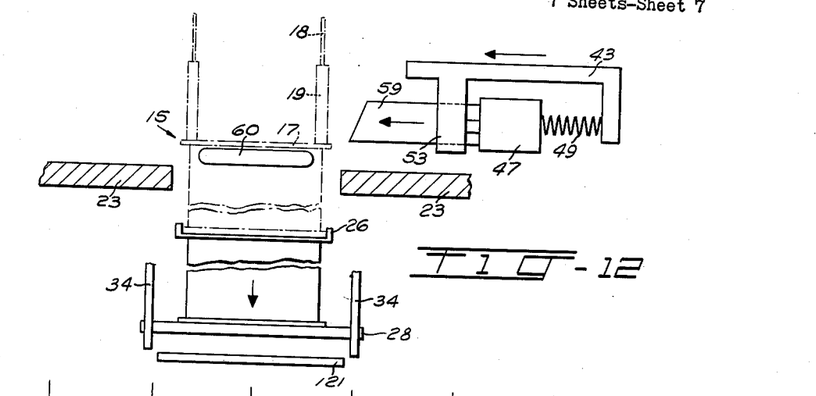
Fig. 12 is a schematic illustration of portions of the apparatus.
Figure 13:
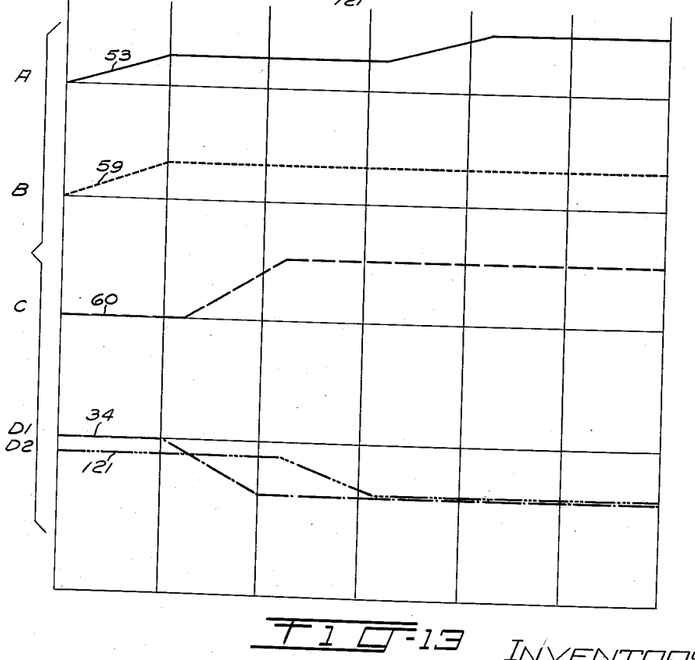
Fig. 13 is a chart of the relative actions of the operating means.

An understanding of the cycle of operation of the apparatus may be accomplished more quickly by reviewing Figs. 12 and 13. The important actions of the apparatus, after the component is located on the support included (1) inward movement of the open pairs of resilient clamps at the lower most portions of the leads to assure their straddling the leads, (2) a short downward movement of the support to position the component for inward movement of the lead controlling element 60, (3) the additional movement of the support while the clamps remain open and (4) closing of the clamps. These actions are important due to the flexible nature of the leads and the possible bent condition of the leads when disposed in the appaartus. It is most important that each lead of the electrical component be included in a definite circuit of the test set. To accomplish this result by initially moving the pairs of clamps toward positions where the bare ends of the leads are presumed to be, would accomplish undesirable results. Seldom, if ever, are the bare ends of the leads in positions where they could be gripped simultaneously by clamps. Therefore, the pairs of clamps are moved with respect to the lower portions of the leads where, regardless of how the leads may be bent, the clamps are sure to straddle their respective leads. The short first downward movement of the support with the component relies upon the pairs of clamps isolating the respective leads therein until the lead controlling element 60 is moved into position so that its side edges will be disposed against the insulated portions of the leads and force the leads to remain in their respective clamps during the initial movement of the support and component. The timing of these actions may be understood more clearly by viewing the chart in Fig. 13 where the reference numerals applied to the clamp closing member 53 of the carriage 43 identifies the line illustrating the two motions of this member. Reference numeral 59 identifies the next line on the chart representing the forward motion of each pair of clamps. Reference numeral 60 identifies the next line of the chart representing movement of the lead controlling element 60 and reference numerals 34 and 121 respectively identify lines representing the first and second motions of the support and component. These motions originate with the air cylinder, primarily with the drive shaft 63 to rotate the drive members 71 to 75 inclusive. The drive members are mounted in certain positions on the shaft 63 so that the timing of their actions as illustrated in Fig. 13 will bring about a sequence of movements of the carriages with their riders 46 and 47, the lead controlling element 60 and the support 26. At the end of this portion of the operating cycle of the apparatus, the leads 18 of the component having been secured formally in their pairs of clamps 59 are included in the test set not shown. This condition remains until the windings of the relay or the units of an electrical component have been tested. After this time interval has elapsed and the tests have been made, a reverse motion is imparted to the piston of the air cylinder 65, reversing the motion of the rack 67 through the piston rod 66 and reversing the action of the various parts of the apparatus to move them to their normal positions. These actions may be illustrated in Fig. 13 reading from right to left instead of from left to right to follow the initial portion of the operating cycle. The tested component may be removed from an apparatus and another component for test may be inserted therein and the operation repeated.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for making electrical connections with leads extending at spaced positions from one end of an electrical component comprising normally open pairs of conductive lead clamps, a dielectric member to support the clamps at positions spaced comparable to the spaced positions of the leads, means to support the dielectric member for movement in a given plane, a seat for the component, means to support the seat for movement in a plane at right angles to the plane of the clamps, means to move the dielectric member to move the clamps while open to cause each pair of clamps to straddle its respective lead adjacent the end of the component, means to move the seat to move the component away from the clamps to thereby move the leads in their open clamps to locate predetermined portions of the leads in the clamps, and means to close the clamps on said portions of their leads.

2. The apparatus for making electrical connections with leads according to claim 1 in which the open clamps straddle their leads to thereby maintain spacing of the leads therein from each other during movement of the seat, an element normally disposed laterally of the component on the seat, and means to move the element relative to the leads of the component into a position transversely of open ends of the clamps to maintain the leads in their open clamps and cooperate with the clamps to straighten the leads during movement of the support and component relative to the clamps.

3. The apparatus for making electrical connections with leads according to claim 1 in which a carriage supports the clamp closing means, and a riding element supports the dielectric member and supported by the carriage to ride between given limits thereon.

4. The apparatus for making electrical connections with leads according to claim 3 in which compressible means cause the riding element to ride with the carriage from a normal position away from the seat to an operating position toward the leads of the component on the seat, and means to stop movement of the riding element to locate the open clamps in positions straddling their leads.

5. The apparatus for making electrical connections with leads according to claim 4 in which means are operated to cause additional movement of the carriage after the riding element is stopped to move the clamp closing means to close the clamps on the leads.

6. The apparatus for making electrical connections with leads according to claim 4 in which a driving means for the carriage is operated at two different intervals in timed relation to the movement of the seat, the first causing the carriage to move the riding element against its stop to position the open clamps to straddle their leads before movement of the seat and the second to move the carriage relative to the riding element after movement of the seat to cause the clamps to grip their leads.

7. The apparatus for making electrical connections with leads according to claim 6 in which the driving means for the carriage operates in a reverse order in moving the carriage to its initial limit and thereby causing opening of the clamps by the clamp closing means and the returning of the clamps and riding element to the normal positions.

8. An apparatus for making electrical connections with a group of leads extending at spaced positions longitudinally from a head of an electrical component comprising a seat for the component, means to move the seat first and second distances in a given path relative to a normal position for the seat, a carriage, means to support the carriage for movement at right angles to the path, means to move the carriage between a normal position and first and second limits, a riding element supported for movement with the carriage between the first set of limits, normally open pairs of conductive lead clamps carried by the riding element and movable therewith from one side of the group of leads to a position where they will straddle their respective leads adjacent the head when the seat is in its normal position, a lead controlling element normally disposed at one side of the path, means to support the lead controlling element for movement adjacent a side of the group of leads opposing the clamps after movement of the seat the first distance to force the leads to remain in their open clamps during movement of the seat the second distance, and a member mounted on the carriage for movement therewith to close the clamps on their leads during movement of the carriage to the second limit.

9. An apparatus for making electrical connections with leads according to claim 8 in which a drive shaft is supported for rotation, means to rotate the drive shaft a given cycle in one direction, driven members mounted at spaced positions relative to the shaft and actuable to respectively move the carriage between its first and second limits during given spaced intervals of time, move the seat its first and second distances during spaced intervals of time and move the carriage lead controlling element laterally of the group of leads subsequent to the first movements of the carriage and seat, and drive members for the driven members rotated by the shaft, on which they are mounted, to actuate their driven members during predetermined portions of the cycle.

10. An apparatus for making electrical connections with leads according to claim 9 in which two sets of driven and drive members are provided for the seat, one set being effective to move the seat the first distance and the other set being effective to move the seat the second distance.

11. An apparatus for making electrical connections with leads according to claim 9 in which the rotating means is adapted to rotate the drive shaft like distances in opposite directions at spaced intervals so that the driven means will be caused to move the support, carriage and lead controlling element in a given order away from their normal positions when the shaft is rotated in one direction and to move the support, carriage and lead controlling element in a reverse order when the shaft is rotated in the reverse direction.

12. An apparatus for making electrical connections with spaced groups of leads extending longitudinally from a head of an electrical component comprising a seat for the component means operable to move the seat first and second distances from a normal position in a given path, normally open groups of pairs of conductive lead clamps, dielectric members to support the groups of clamps on different sides of the seat, means to support the dielectric members for movement in a plane at right angles to the path of the seat, means to move the dielectric members to move the clamps while open to straddle their respective leads, means to move the seat to move the leads in their open clamps to locate predetermined portions of the leads in their clamps, and means operable to close the clamps on their respective leads.

13. An apparatus for making electrical connections with spaced groups of leads according to claim 12 in which the open clamps space the leads therein from each other during movement of the seat, an element normally disposed at one side of the path and having lead engaging edges, and means to move the element between the groups of leads to cause the edges thereof to engage the leads and force them to remain in their open clamps during movement of the seat and component relative to the clamps.

References Cited in the file of this patent
UNITED STATES PATENTS

| | | |
|---|---|---|
| 2,075,632 | Zuckerman | Mar. 30, 1937 |
| 2,126,674 | Stout | Aug. 9, 1938 |
| 2,510,944 | Auerbach | June 13, 1950 |
| 2,606,228 | Chouljian | Aug. 5, 1952 |